(12) United States Patent
Crean

(10) Patent No.: US 6,439,648 B1
(45) Date of Patent: *Aug. 27, 2002

(54) CHASSIS FOR A FIFTH WHEEL TRAVEL TRAILER

(75) Inventor: Johnnie Robert Crean, Chino, CA (US)

(73) Assignee: Alfa Leisure, Inc., Chino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/859,230

(22) Filed: May 15, 2001

Related U.S. Application Data

(63) Continuation of application No. 09/493,337, filed on Jan. 28, 2000, now Pat. No. 6,231,115.

(51) Int. Cl.$^7$ ............................................. B62D 63/06
(52) U.S. Cl. ........................................ 296/182; 280/789
(58) Field of Search ................................ 296/181, 182, 296/183, 204; 280/789

(56) References Cited

U.S. PATENT DOCUMENTS

| | | | |
|---|---|---|---|
| 3,300,839 A | 1/1967 | Lichti | |
| 3,735,998 A | 5/1973 | Green | |
| 4,147,379 A | 4/1979 | Winslow | |
| 4,971,355 A | 11/1990 | Studdard | |
| 5,028,072 A | 7/1991 | Lindsay | |
| 5,112,082 A | 5/1992 | Clelland | |
| 5,143,418 A | 9/1992 | Fouquet | |
| 5,242,185 A | 9/1993 | Carr et al. | |
| 5,401,050 A | 3/1995 | Baker | |
| 5,403,063 A | 4/1995 | Sjostedt et al. | |
| 5,746,473 A | 5/1998 | Crean | |
| 5,791,726 A | 8/1998 | Kaufman | |
| 6,231,115 B1 * | 5/2001 | Crean | 296/182 |

* cited by examiner

*Primary Examiner*—Joseph D. Pape
(74) *Attorney, Agent, or Firm*—Knobbe, Martens, Olson & Bear, LLP

(57) ABSTRACT

A fifth wheel travel trailer having an improved chassis, the chassis comprising a rear section, a mid-section, and a front section disposed in vertically offset horizontal planes. The trailer further comprises a carriage member having a plurality of rotatable wheels mounted underneath the rear section of the chassis and a housing member having an interior living space formed therein mounted above the chassis. The rear section of the chassis comprises a pair of main longitudinal members each having a pair of stacked I-beams such that upper surfaces of the main longitudinal members define a first horizontal mounting plane suitably elevated above the wheels of the carriage assembly so as to enable a rear section of a floor assembly to mount directly to the rear section of the chassis in the first mounting plane to thereby increase the rigidity of the rear section of the chassis. The rear section of the chassis further comprises a plurality of inner cross members that interconnect the main longitudinal members in a perpendicular manner such that upper surfaces of the inner cross members define a second horizontal mounting plane so as to enable a lower horizontal wall to mount to the chassis in the second mounting plane to thereby define a plurality of channels disposed between the rear section of the floor assembly, the lower horizontal mounting plane, and the main longitudinal members. The rear section of the chassis further comprises a plurality of inner longitudinal members disposed between the main longitudinal members and mounted to the chassis in the second mounting plane such that upper surfaces of the inner longitudinal members are disposed in the first mounting plane so as to enable the rear section of floor assembly to mount thereto and so as to longitudinally extend the channels.

28 Claims, 8 Drawing Sheets

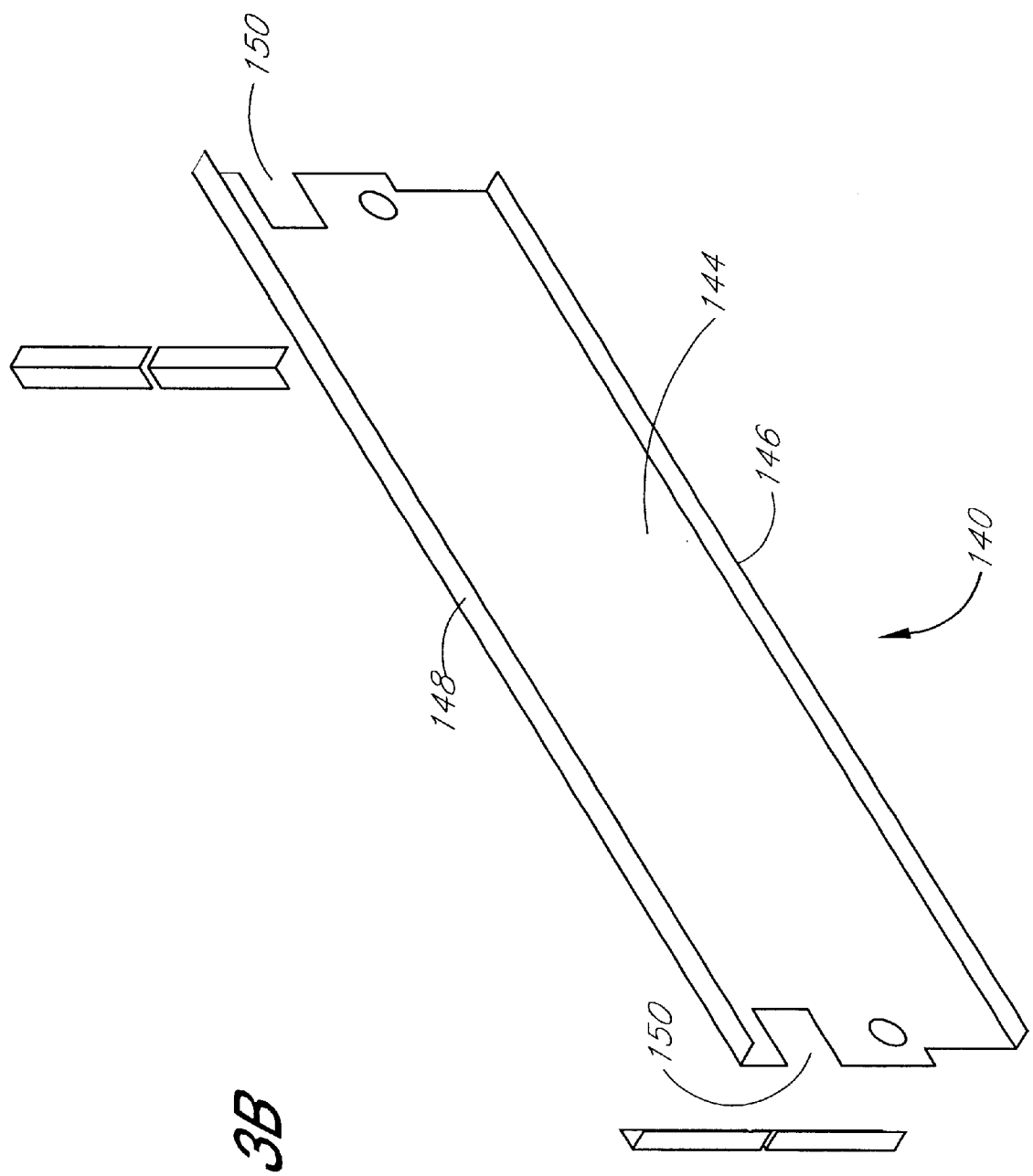

CHASSIS FOR A FIFTH WHEEL TRAVEL TRAILER

RELATED APPLICATIONS

This is a continuation of application Ser. No. 09/493,337 filed Jan. 28, 2000 now U.S. Pat. No. 6,231,115.

BACKGROUND OF THE INVENTION

1. Field of the Invention

The present invention relates to travel trailers and, in particular, relates to a chassis for a fifth wheel travel trailer.

2. Description of the Related Art

Recreational fifth wheel travel trailers provide individuals with spacious, comfortable and transportable lodging. In particular, a typical fifth wheel travel trailer comprises a housing member having a multi-level interior living space formed therein, a multi-level chassis adapted to support the housing member, and a carriage member having a plurality of wheels interposed between the chassis and a supporting surface so as to enable the trailer to travel on the supporting surface. Furthermore, the typical fifth wheel trailer is adapted to detachably mount to a towing vehicle so that a front end of the trailer extends beyond the load bearing rear wheels of the towing vehicle so as to enable the towing vehicle to essentially act as a fifth wheel.

Since fifth wheel trailers are currently available with lengths as great as forty feet and pop-out sections that provide the housing member with increased width, their interior living spaces are able to resemble that of a nicely appointed home. For example, it is common now for a fifth wheel travel trailer to include a large kitchen, a large bathroom, a large bedroom, and a large living area. Moreover, such trailers typically include multiple water storage tanks for supplying hot and cold water as well as for storing waste water, wiring for distributing electrical power and a central heating/ventilation/air conditioning (HVAC) system for providing desirable environmental conditions within the interior living space.

Thus, the typical fifth wheel travel trailers is often relatively heavy and its mass is often spatially distributed over a relatively large volume. Consequently, the chassis of the trailer is often exposed to relatively large bending moments. However, since typical chassis are often formed with insufficient rigidity, they are often unable to maintain a sufficiently fixed shape in response to spatially distributed gravitational forces exerted on the trailer. Thus, the relatively large strains of the chassis are often transferred to the housing member so as to produce unpleasant noises and so as to inhibit interior items, such as cabinet doors, from operating in a desired manner due to these items being placed in a strained condition.

In other words, the large size and weight of the chassis results in portions of the chassis deforming over continued towing of the vehicle. Typically, a floor structure is built up above the chassis and deformation of the chassis can result in the floor deforming over time. Deformations in the floor can result in uneven flooring and can also result in cabinets and fixtures becoming detached or warped over time. This problem is particularly accentuated by the fact that the modern fifth wheel trailer is often used as a second home and is attempting to closely approximate the level of quality in construction that is found in an actual home. However, the fifth wheel trailer is also designed to be towed which results in vibrations and stresses transmitted to the chassis, the flooring and interior furnishings which can result in the foregoing problems.

The difficulties associated with building a chassis that is sufficiently rigid to inhibit the deformation of the flooring and interior furnishing resulting from towing the trailer is increasingly resulting in prior art chassis designs that are increasingly complicated and involve heavier structural members. However, increasingly complicated chassis designs significantly increase the cost of production of the travel trailer. Moreover, the trend in the industry is to increase the amount of furnishings in the travel trailer at a cost of increasing the weight of the vehicle. Hence, the increases in the weight of the travel trailer resulting from the increase in the weight of the structural components of the chassis can often result in a larger proportion of the travel trailers weight being consumed by the weight for the chassis.

From the foregoing, therefore, it will be appreciated that there is a need for an improved chassis for a travel trailer such as a fifth wheel. In particular, there is a need for the chassis to be relatively rigid so as to reduce strain related noises and so as to reduce the transferring of strain to interior items of the trailer. Furthermore, there is a need for the chassis to be relatively lightweight so as to reduce the weight of the trailer. Moreover, there is a need for the chassis to have a simple design so as to enable the chassis to be fabricated at a relatively low cost.

SUMMARY OF THE INVENTION

The aforementioned needs are satisfied by one embodiment of a fifth wheel travel trailer of the present invention comprising a chassis having a main section and at least one elevated section. In particular, the main section of the chassis comprises a first and a second longitudinally extending main longitudinal member each having an upper mounting surface, a plurality of longitudinally extending inner longitudinal members each having an upper and a lower mounting surface, and a plurality of laterally extending inner cross members each having an upper mounting surface. Furthermore, the plurality of inner cross members are laterally disposed between the main longitudinal members so as to interconnect the main longitudinal members such that the upper mounting surfaces of the main longitudinal members align with a first mounting plane and such that the upper mounting surfaces of the inner cross members align with a second mounting plane positioned beneath the first mounting plane. Moreover, the plurality of inner longitudinal members are disposed between the main longitudinal members such that the lower mounting surfaces of the inner longitudinal members are positioned adjacent the upper mounting surfaces of the inner cross members and such that the upper mounting surfaces of the inner longitudinal members are substantially aligned with the first mounting plane. The fifth wheel travel trailer further comprises a housing member comprising a plurality of walls so as to define an interior living space therein, wherein the housing member upwardly extends from the chassis so as to receive support therefrom. The fifth wheel travel trailer further comprises a carriage member comprising a plurality of rotatably mounted wheels so as to provide the trailer with mobility, wherein the carriage assembly downwardly extends from the main section of the chassis so as to support the chassis. The fifth wheel travel trailer further comprises a floor assembly comprising a main section, wherein the main section of the floor assembly directly mounts to the main section of the chassis in the first mounting plane so as to further rigidify the main section of the chassis, wherein the space between the main section of the floor assembly, the main longitudinal members, the inner longitudinal members, and the inner cross members defines a plurality of longitudinally extending channels.

In another aspect of the invention, the aforementioned needs are satisfied by a travel trailer comprising a chassis having a main section and at least one elevated section wherein the main section of the chassis is comprised of a plurality of lateral cross-members and a plurality of longitudinal members that are interconnected at a plurality of interconnection points so that upper surfaces of the plurality of longitudinal members are substantially co-planer at a first height. Furthermore, the plurality of lateral cross-members are attached to the plurality of longitudinal members such that the plurality of interconnection points are located beneath the first height. The travel trailer further comprises a carriage member comprising a plurality of rotatably mounted wheels so as to provide the trailer with mobility, wherein the carriage assembly downwardly extends from the main section of the chassis so as to support the chassis. The travel trailer further comprises a floor comprised of at least one panel directly attached to the upper surfaces of the plurality of longitudinal members so that at least one longitudinal channel is defined by the floor, the plurality of longitudinal members and the lateral cross-members. The travel trailer further comprises a housing member defining an interior living space therein, wherein the housing member upwardly extends from the chassis so as to receive support therefrom.

From the foregoing, it should be apparent that main section of the chassis of the travel trailer of the present invention provides the travel trailer with a relatively high degree of rigidity in response to the weight of the trailer. Thus, the main section of the chassis is less likely to experience warping, thereby enabling interior items, such as cabinet doors, to operate in a more desirable manner. Furthermore, the longitudinal channels defined within the main section of chassis enable elongate elements, such as air ducts and electrical cables, of the travel trailer to be longitudinally disposed therein. These and other objects and advantages of the present invention will become more apparent from the following description taken in conjunction with the accompanying drawings.

BRIEF DESCRIPTION OF THE DRAWINGS

FIG. 3B is a perspective view of another embodiment of a inner cross member of the rear section of the chassis of FIG. 2A.

DETAILED DESCRIPTION OF THE PREFERRED EMBODIMENT

Figure 1A:
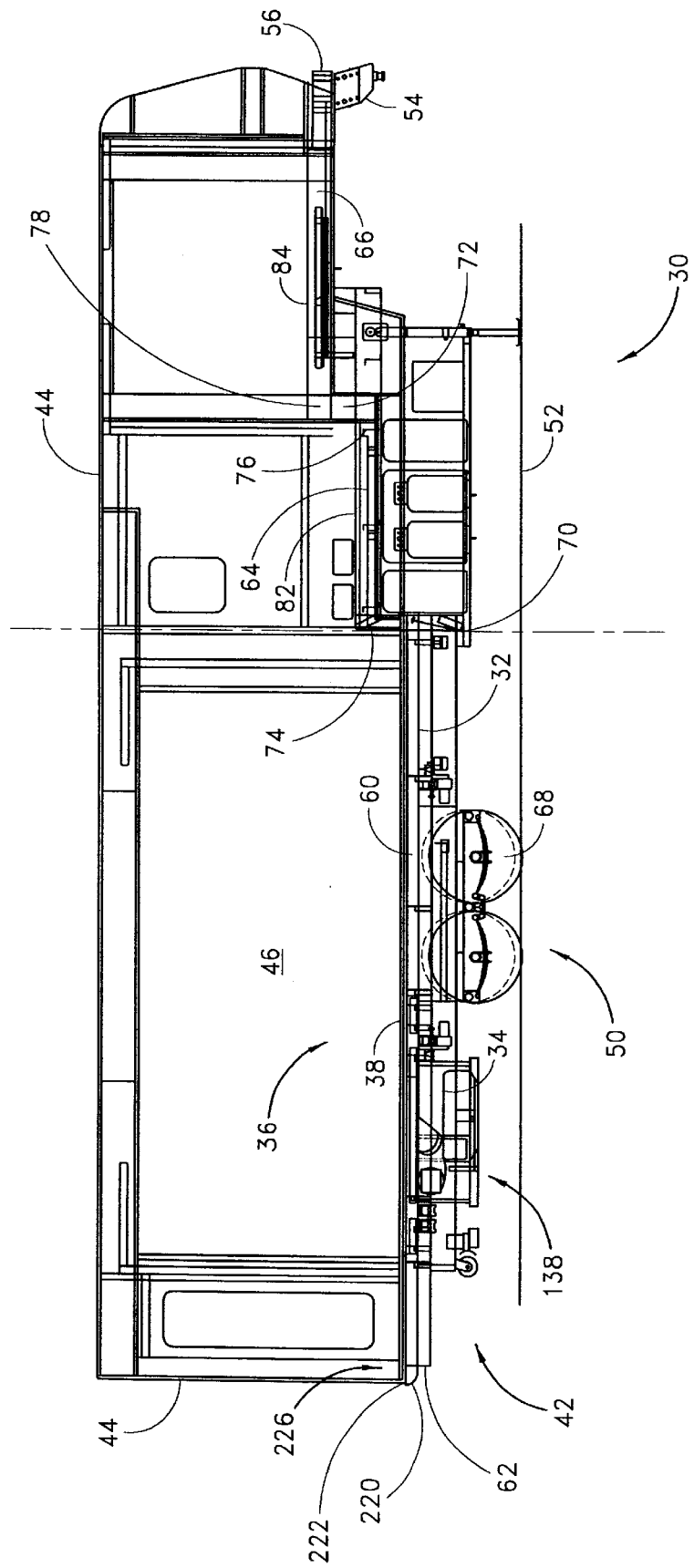
FIG. 1A is a side view of a fifth wheel travel trailer comprising a chassis of the present invention which provides the travel trailer with improved support.

Reference will now be made to the drawings wherein like numerals refer to like parts throughout. In particular, the drawings illustrate the preferred embodiments of a fifth-wheel travel trailer 30 formed with an improved multilevel chassis 32 having a relatively rigid rear section 34. As will be described in greater detail below, the rear section 34 of the chassis 32 is adapted so as to define a first mounting plane that allows a rear section 38 of a floor assembly 36 of the trailer 32 to directly mount to the rear section 34 of the chassis 32 in the first mounting plane so as to provide the rear section 34 of the chassis 32 with increased rigidity. Furthermore, the rear section 34 of the chassis 32 is further adapted so as to define a second mounting plane disposed beneath the first mounting plane such that the space between the first and second mounting planes define a plurality of channels 40 that longitudinally extend along the rear section 34 of the chassis 32.

As shown in FIG. 1A, the trailer 30 comprises a known housing member 42 having a plurality of outer walls 44 so as to provide the trailer 30 with a multilevel interior living space 46. Furthermore, the housing member 42 is positioned above the chassis 32 and mounted to the perimeter of the chassis 32 in a well known manner so that the chassis 32 supports the housing member 42. Moreover, the trailer 30 comprises a known carriage assembly 50 adapted to support the chassis 32 so as to enable the trailer 30 to travel on a rigid supporting surface 52, such as a road or parking lot. Additionally the trailer 30 comprises a conventional hitch 54 mounted to a front end 56 of the chassis 32 and adapted to couple with a matching hitch receiver of a towing vehicle (not shown) so as to enable the trailer 30 to couple with the towing vehicle in a well known manner.

As shown in FIG. 1A, the trailer 30 further comprises the chassis 32. In particular, the chassis 32 of the trailer 30 comprises a plurality of interconnecting horizontal planar sections 60. More particularly, the horizontal planar sections 60 comprise the relatively large rear section 34 extending from a rear end 62 of the chassis 32, a known midsection 64 that forwardly extends from the rear section 34 so as to be elevated above the rear section 34, and a known front section 66 that forwardly extends from the midsection 64 so as to be elevated above the midsection 64.

The chassis 32 in this configuration is similar to the chassis described in U.S. Pat. No. 5,746,473 to Crean which is hereby incorporated by reference in its entirety. Thus, the chassis 32 comprises the general shape of a chassis of a typical fifth wheel travel trailer that enables the housing member 42 to have the generously sized interior living space 46 and that also enables the front end 56 of the chassis 32 to extend over the rear wheels of the towing vehicle. However, as will be described in greater detail below, the rear section 34 is formed with an improved design so as to obtain increased rigidity.

As shown in FIG. 1A, the carriage assembly 50 is positioned below the chassis 32 of the trailer so as to support the chassis 32 above the supporting surface 52. In particular, the carriage assembly 50 comprises a plurality of rotatably captured wheels 68 each adapted to simultaneously roll along the supporting surface 52 so as to provide the trailer 30 with mobility. Furthermore, the carriage assembly 50 is mounted below the rear section 34 of the chassis 32 so that the rear section 34 is prevented from contacting the road 52. Moreover, the carriage assembly 50 is positioned slightly to the rear of the center of mass of the trailer 30 so that the weight of the trailer 30 is primarily supported by the carriage assembly 50 and so that a relatively smaller percentage of the weight of the trailer 30 is supported by the towing vehicle.

Thus, the rear section 34 of the chassis 32 essentially forms a cantilever that extends from the carriage assembly 50 in both a forward and rearward manner. Furthermore, as will be described in greater detail below, the carriage assembly 50 is positioned between the wheels 68 so that the longitudinal side edges of the rear section 34 of the chassis 32 are laterally offset from side edges of the carriage assembly 50. Consequently, the rear section 34 of the chassis 32 is also cantilevered from the carriage assembly 50 in a lateral manner.

As shown in FIG. 1A, the chassis 32 of the trailer 30 further comprises known rear and front vertical risers 70, 72 that interconnect the horizontal sections 32, 64, 66 of the chassis 32. In particular, the rear section 32 of the chassis 32 horizontally extends from the rear end 62 of the chassis 32 to the rear vertical riser 70 and attaches thereto in a well known manner. Furthermore, the rear vertical riser 70 vertically extends from the rear section 32 to a rear end 74 of the midsection 64 of the chassis 32. Moreover, the rear vertical riser 70 is formed to withstand relatively large bending moments in a well known manner so that the midsection 64 and front section 66 of the chassis 32 are substantially fixed with respect to the rear section 32.

As shown in FIG. 1A, the front vertical riser 72 interconnects the midsection 64 and front section 66 of the chassis 32. In particular, the midsection 64 horizontally extends from the rear vertical riser 70 to the front vertical riser 72. Furthermore, the front vertical riser 72 vertically extends from a front end 76 of the midsection 64 of the chassis 32 toward a rear end 78 of the front section 66 of the chassis 32. Moreover, the midsection 64, the front vertical riser 72, and the front section 66 of the chassis 32 are formed in a well known manner so that the midsection 64 and front section 66 remain substantially fixed with respect to each other.

Figure 1B:
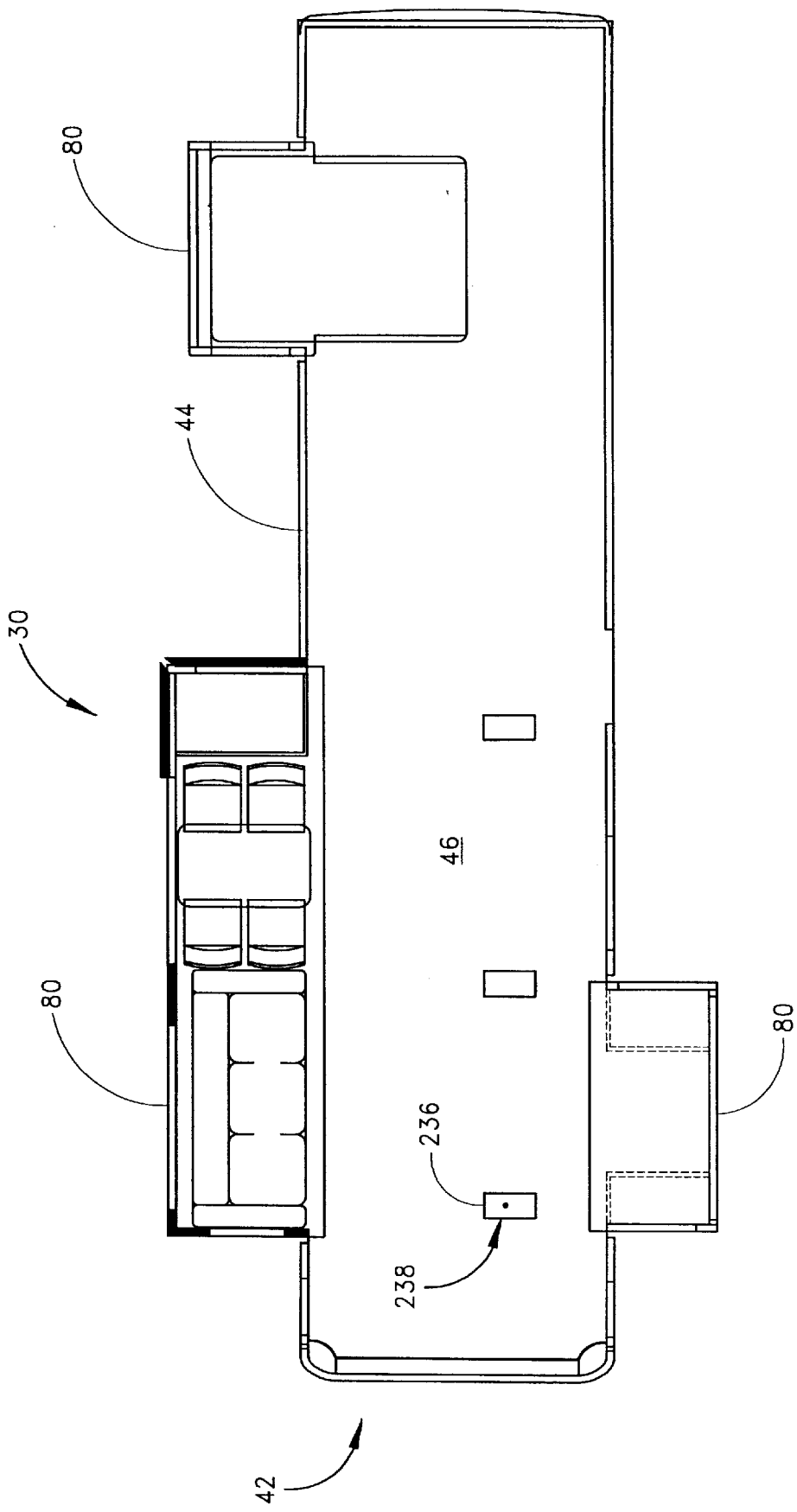
FIG. 1B is an overhead view of the fifth wheel travel trailer of FIG. 1A illustrating a plurality of pop-out members in an extended configuration.

In one embodiment, the trailer 32 further comprises a plurality of known pop-out sections 80 as shown in FIG. 1B in an extended configuration. In particular, the pop-out sections 80 are slidably mounted to the chassis 32 in a well known manner such that they are able to laterally extend from the trailer 32 to thereby increase the interior living space 46 of the trailer 32. Furthermore, when extended, the pop-out sections 80 are cantilevered from the chassis 32.

Thus, the rear section 34 of the chassis 32 is exposed to relatively large bending moments. In particular, since the front section 66 and the midsection 64 of the chassis 32 extend from the rear section 34 in an essentially cantilevered manner, a relatively large bending moment is developed so as to longitudinally camber the rear section 34 of the chassis 32. Furthermore, since the pop-out sections 80 laterally extend from the rear section 34 of the chassis 32 in a cantilevered manner, a relatively large bending moment is developed so as to laterally camber the rear section 34 of the chassis 32. Moreover, since the housing member 42 is mounted to the perimeter of the rear section 34 of the chassis 32, bending moments developed therefrom further camber the rear section 34 of the chassis 32 both laterally and longitudinally. To address this potential problem the rear section 34 of the chassis 32 is formed with improved rigidity so to more effectively maintain the rear section 34 of the chassis 32 with a planar shape as will be described in greater detail below.

As shown in FIG. 1A, the trailer 32 further includes a known multilevel floor assembly 36 positioned above the chassis 32. In particular, the floor assembly 36 comprises the rear section 38, a midsection 82, and a front section 84, which are respectively positioned above the rear section 34, the midsection 64, and the front section 66 of the chassis 32. Moreover, as will be described in greater detail below, the rear section 32 of the floor assembly 36 directly mounts to the rear section 34 of the chassis 32 in the first mounting plane of the rear section 34 so as to provide the chassis 32 with increased structural strength.

Figure 2A:
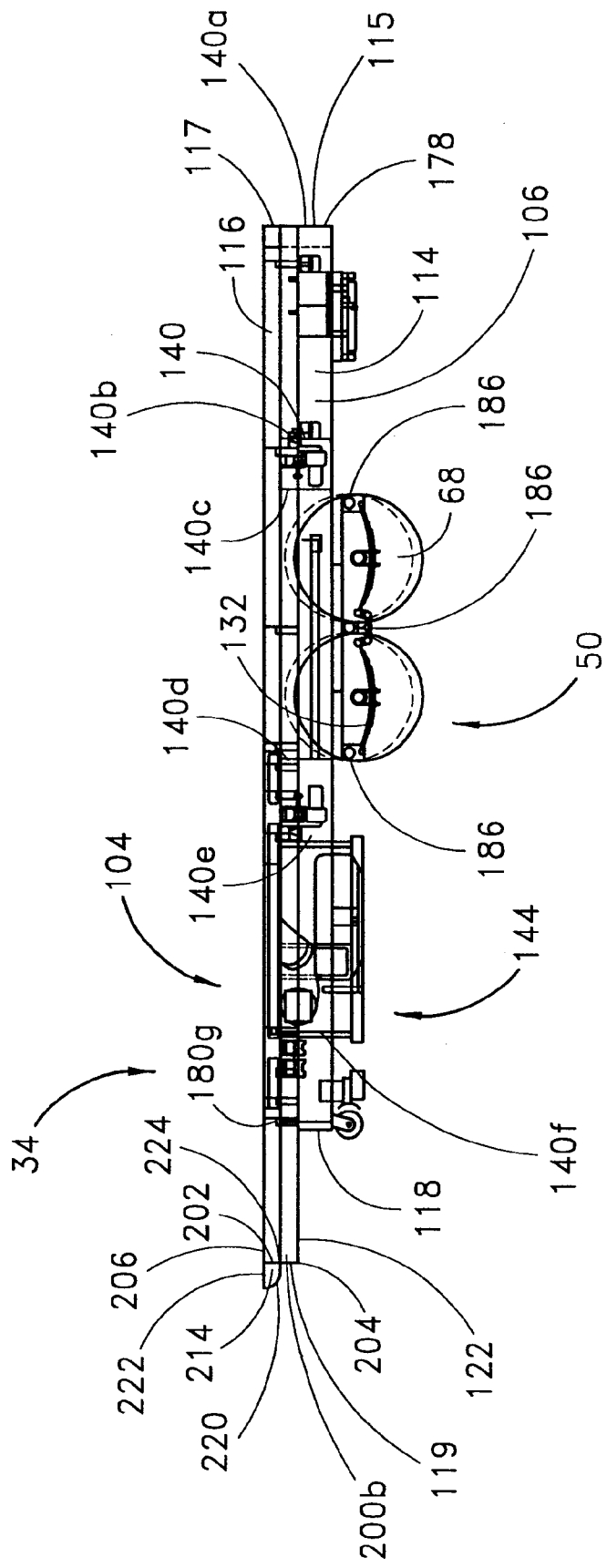
FIG. 2A is a side view of a rear portion of the chassis of the trailer of FIG. 1A.
Figure 2B:
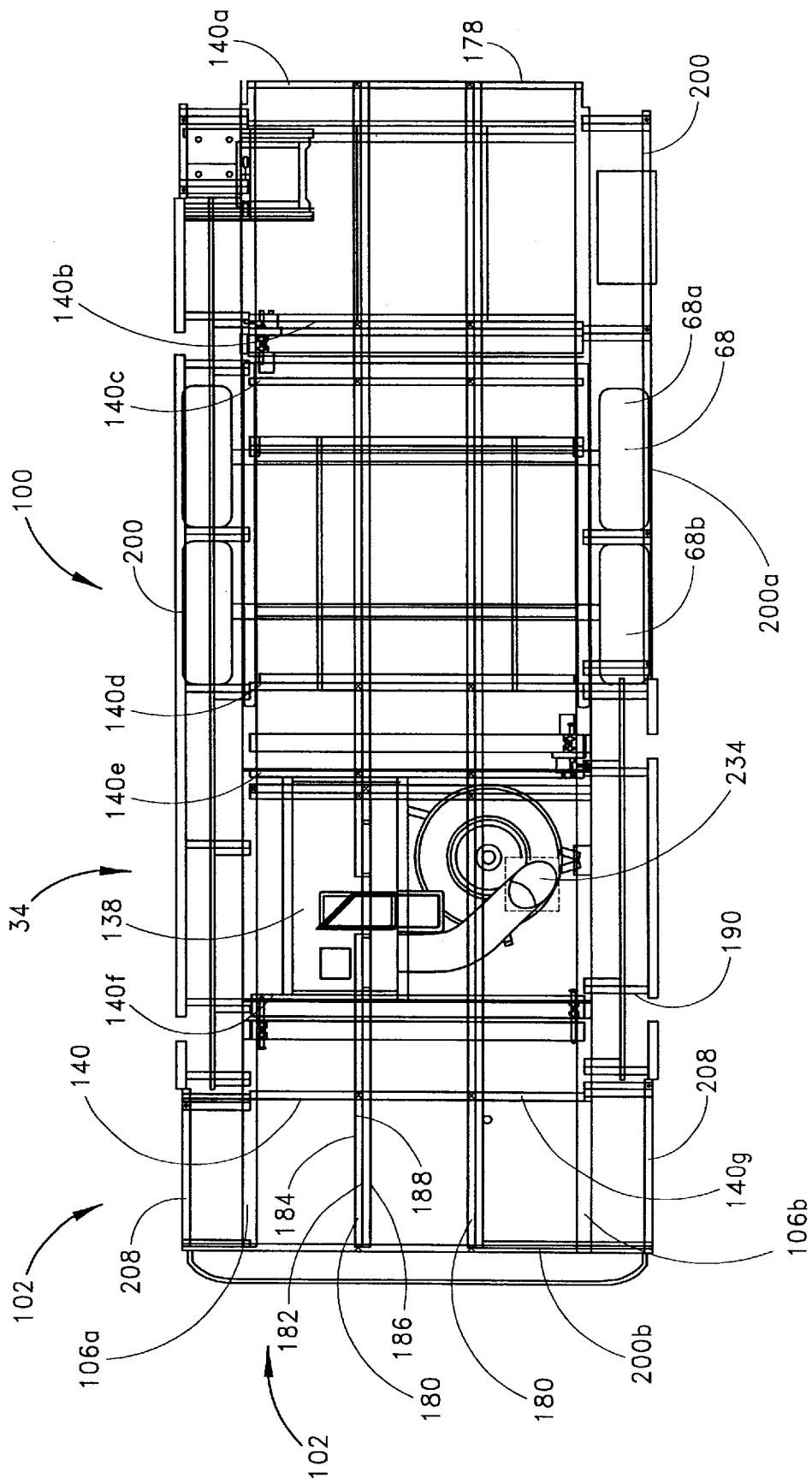
FIG. 2B is an overhead view of the rear portion of the chassis of FIG. 2A.
Figure 2C:
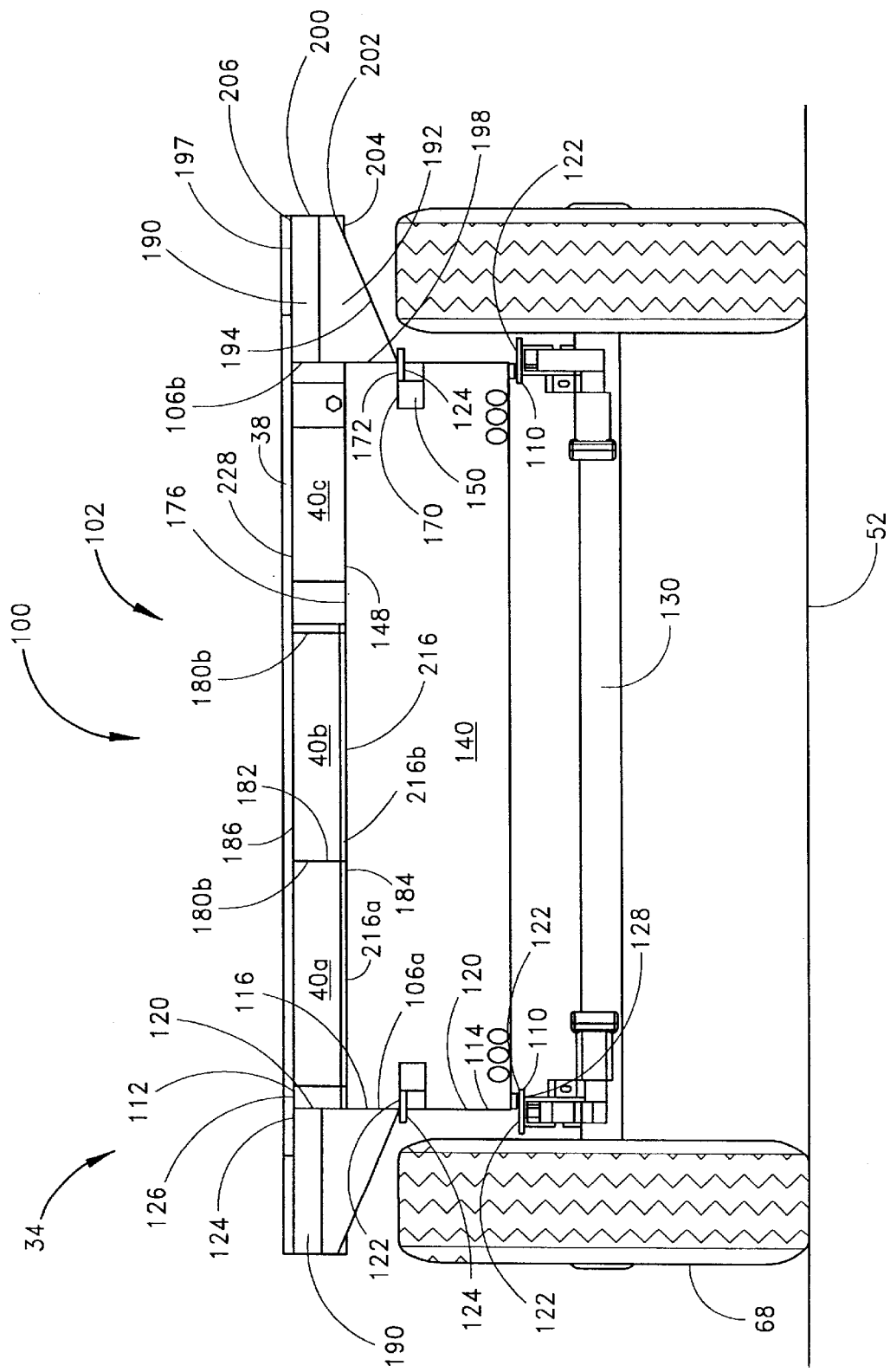
FIG. 2C is an end view of the rear portion of the chassis of FIG. 2A.

Reference will now be made to FIGS. 2A–C which illustrate the rear section 34 of the chassis 32 in greater detail. In particular, the rear section 34 comprises a plurality of rigid support members 100. More particularly, the support members 100 comprise a plurality of longitudinal support members 102 and a plurality of lateral support members 104 that interconnect with each other so as to provide the rear section 34 of the chassis 32 with improved rigidity. Furthermore, as will be described in greater detail below, the support members 100 are arranged so that the rear section 34 defines the first mounting plane adapted to directly receive the rear section 38 of the floor assembly 36 so as to further increase the rigidity of the rear section 34 of the chassis 32.

As shown in FIG. 2B, the longitudinal support members 102 comprise a first and second main longitudinal support member 106a, 106b, collectively referred to hereinbelow as the main longitudinal members 106. In particular, the main longitudinal members 106 longitudinally extend along the rear section 34 of the chassis and are each preferably positioned interior to the wheels 68 of the carriage assembly 50. Furthermore, as will be described in greater detail below, the main longitudinal members 106 are formed with relatively rigid characteristics so as to substantially resist bending in response to vertical forces applied thereto. Moreover, as shown in FIG. 2C, the main longitudinal members 106 are formed with a vertical height that enables the main longitudinal members 106 to vertically extend from an upper mounting surface 110 of the carriage assembly 50 to a lower mounting surface 112 of the rear section 38 of the floor assembly 36. Thus, the main longitudinal members 106 are able to directly attach to the rear section 38 of the floor assembly 36 to thereby provide the rear section 34 of the chassis 32 with increased rigidity.

As shown in FIG. 2C, in the preferred embodiment, the main longitudinal members 106 are each formed of a lower and upper I-beam 114,116. In particular, each I-beam 114, 116 comprises an elongate central wall 120 and an elongate lower and upper planar flange 122, 124 extending from the central wall 120 in a perpendicular manner so that each I-beam 114, 116 is elongate and so that the cross-section of each I-beam 114, 116 has the shape of an I. Furthermore, each I-beam 114, 116 is preferably formed of a relatively strong material, so as to resist bending in response to relatively large forces applied perpendicular to the flanges 122, 124.

In one embodiment, each I-beam 114, 116 is formed of steel with the central wall 120 having a height and thickness approximately equal to 8 inches and $3/16$ inch respectively. Furthermore, the flanges 122, 124 of each I-beam 114, 116 are formed with a width and thickness approximately equal to 3 inches and $5/32$ inch respectively. In one embodiment, the central wall 120 of each I-beam 114, 116 formed of corrugated steel so as to enable the I-beams 114, 116 to have an increased strength to weight ratio.

As shown in FIG. 2C, each main longitudinal member 106 is formed by stacking the upper I-beam 116 above the adjacent lower I-beam 114 and connecting the I-beams 114,116 either through welds, fasteners or both. In particular, the upper I-beam 116 is positioned above the lower I-beam 114 so that the lower flange 122 of the upper I-beam 116 overlays the upper flange 124 of the lower I-beam 114 in a substantially flush manner. Furthermore, the I-beams 114, 116 are aligned so as to be parallel with each other so that each main longitudinal member 106 is formed with an elongated shape.

Thus, since each I-beam 114, 116 is substantially rigid in response to forces applied perpendicularly to the flanges 122, 124, the combination of the first and second I-beams 114, 116 in the foregoing stacked formation provide the main longitudinal members 106 with an increased resistance to bending. Moreover, by stacking the I-beams 114, 116, each main longitudinal member 106 is formed with a relatively large height so as to enable each main longitudinal member 106 to extend from the carriage assembly 50 to a height selected to allow the floor assembly 36 to be mounted directly to the upper I-beam 116 with sufficient clearance from the wheels 68 of the carriage assembly 50 in a manner that will be described in greater detail below. Furthermore, as will also be described in greater detail below, upper planar surfaces 126 of the upper flanges 124 of the upper I-beams 116 define the first mounting plane of the rear section 34 of the chassis 32. Additionally, lower surfaces 128 of the lower flanges 122 of the lower I-beams 114 enable the main longitudinal members 106 to engage with the carriage assembly 50.

As shown in FIG. 2C, the main longitudinal members are vertically aligned with each other so that the flanges 122, 124 of each main longitudinal member 106 are positioned in horizontal planes. In particular, assuming that the carriage assembly 50 is positioned on the supporting surface 52 in a horizontal manner, the main longitudinal members 106 are positioned so that the flanges 122, 124 of each I-beam 114, 116 are horizontally aligned and so that the central wall 120 of each I-beam 114, 116 is vertically aligned. Furthermore, since the central wall 120 of each I-beam 114, 116 is preferably formed with a height of 8 inches, the upper and lower horizontal surfaces 126, 128 of each main longitudinal member 106 are vertically displaced by a relatively large value of approximately 16 inches. As will be described in greater detail below, this relatively large height allows the rear section 38 of the floor assembly 36 to mount directly to the main longitudinal support members 106 without the use of a sub-structure that could add to instability of the floor.

As shown in FIGS. 2A and 2C, the carriage assembly 50 is positioned under the main longitudinal support members 106 of the rear section 34 of the chassis 32. In particular, the carriage assembly 50 comprises a conventional axle subassembly 130 and the plurality of wheels 68 extending therefrom in a conventional manner so as to enable the wheels 68 to rotate with a laterally oriented axis of rotation. Furthermore, the axle subassembly 130 comprises a plurality of rigid mounting members 134 having laterally displaced upwardly facing horizontal planar mounting surfaces 110, a plurality of known flexible suspension members 132 attached to the rigid mounting members 134 and at least one laterally positioned axle 136 attached to the suspension members 132 so as to provide the trailer with shock absorption in a well known manner.

As shown in FIG. 2C, the main longitudinal members 106 of the chassis 32 are supported by the carriage assembly 50. In particular, the main longitudinal members 106 are positioned so that the lower horizontal surface 128 of each main longitudinal member 106 overlays the corresponding upwardly facing horizontal mounting surface 110 of the carriage assembly 50 in a flush manner. Furthermore, the main longitudinal members 106 are attached to the carriage assembly 50 in a well known manner such as by welding and/or bolting the mounting members 134 of the carriage assembly 50 to the lower flanges 122 of the main longitudinal members 106.

In the preferred embodiment, the wheels 68 of the carriage assembly 50 are formed with a radius of approximately 30 inches. Furthermore, the carriage assembly 50 is adapted so that the upper mounting surfaces 110 are always at least 32 inches above the axis of rotation of the wheels 68. Thus, since the main longitudinal support members 106 are preferably formed with a height of approximately 16 inches, the upper horizontal surface 126 of each main longitudinal member 106, which coincides with the first mounting plane of the rear section 34 of the chassis 32, will always be vertically displaced above the wheels 68 by at least 42 inches. Therefore, as will be described in greater detail below, the rear section 38 of the floor assembly 36 can be directly mounted to the upper surface 126 of each main longitudinal member 106 such that the rear section 38 of the floor assembly 36 does not contact the wheels 68 of the carriage assembly 50.

As shown in FIGS. 2A–C, the lateral support members 104 of the rear section 34 of the chassis 32 comprise a plurality of inner cross members 140. In particular, the inner cross members 140 each having a generally planar shape are positioned between the main longitudinal members 106 so that they interconnect the main longitudinal members 106 in a generally perpendicular manner that will be described in greater detail below. Moreover, the cross members 140 are preferably formed of material having a relatively high strength, such as steel, so that they provide the rear section 34 of the chassis 32 with relatively large lateral rigidity.

Figure 3A:
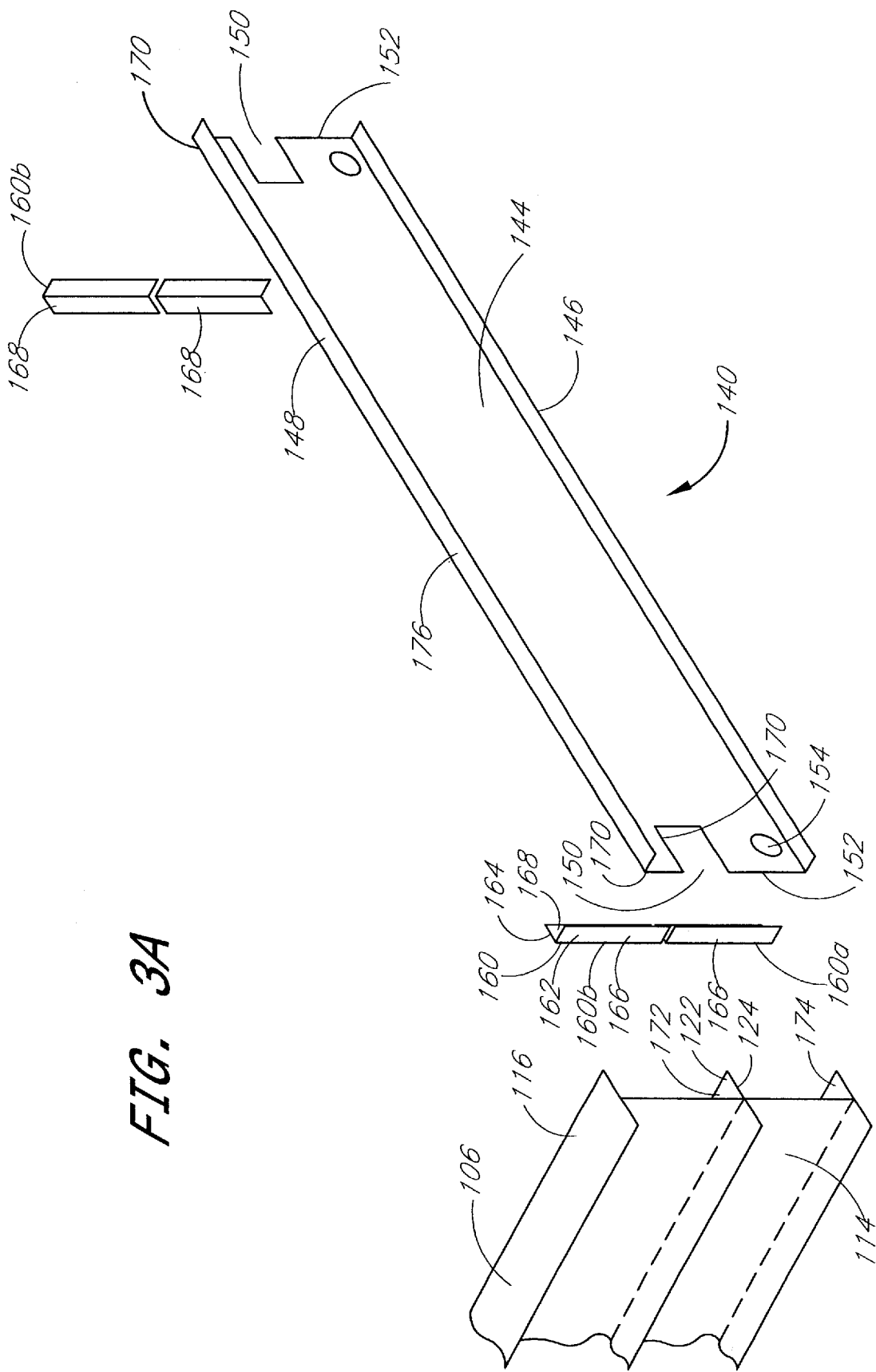
FIG. 3A is a perspective view of one embodiment of a inner cross member of the rear section of the chassis of FIG. 2A.

Reference will now be made to FIGS. 3A–B which illustrate each cross member 140 of the chassis 32 in greater detail. In particular, FIG. 3A illustrates the cross member 140 in a short configuration which is adapted to be positioned above the lower horizontal surface 128 of the main longitudinal support members 106. Furthermore, FIG. 3B illustrates the cross member 140 in a tall configuration which is adapted to extend below the lower horizontal surface 128 of the main longitudinal support members 106 so as to enable the cross member 140 to support a heating ventilation/air conditioning (HVAC) unit 138 positioned below the rear section 34 of the chassis 32.

As shown in FIGS. 3A–B, each cross member 140 comprises a central planar wall 144 and an upper and lower planar lip 146, 148 that extend from opposite horizontal edges of the central planar wall 144 in a substantially perpendicular manner so as to preferably form the cross members 140 with a cross-sectional C shape. Furthermore, the cross members 140 are positioned within the rear section 34 of the chassis 32 so that the central wall 144 is vertically aligned and so that the lips 146, 148 are horizontally aligned. Moreover, the cross members 140 define opposing notches 150 that extend into the vertical edges 152 of the cross members 140 so as to enable the inbound portions of the lower flanges 122 of the upper I-beams 116 and the upper flanges 124 of the lower I-beams 114 of the main longitudinal members 106 to extend therein as will be described in greater detail below. Furthermore, in one embodiment, the central wall 144 of each cross member 140 comprises at least one aperture 154 so as to enable non-structural elements, such as electrical cable, to extend therethrough.

Each inner cross member 140 is preferably mounted to the main longitudinal support members 106 using a plurality of attachment members 160 as shown in FIGS. 3A–B. In particular, each attachment member 160 is formed of material having a relatively high strength, such as steel, and comprises a first and second planar 162, 164 wall that extends from each other in a substantially perpendicular manner. Consequently, each attachment member 160 includes a first mounting surface 166 which is also the planar outer surface of the first wall 162 and a second mounting surface 166 which is also the planar inner surface of the second wall 164 so that the first and second mounting surfaces 166, 168 are perpendicular to each other.

As shown in FIG. 3A, the attachment members 160 mount to the main longitudinal members 106 and the cross members 140 mount to the attachment members 160. In particular, each cross-member 140 is preferably assigned four attachment members 160 such that lower and upper attachment members 160a, 160b are positioned adjacent each other along the vertical edge 152 of each cross-member 140. Furthermore, each upper and lower attachment member 160a, 160b is positioned so that the first mounting surfaces 166 extending therefrom are aligned in a common longitudinally oriented vertical plane and so that the second mounting surfaces 168 extending therefrom are aligned in a common laterally oriented vertical plane.

As shown in FIG. 3A, the first wall 162 of each attachment members 160 attaches to the central walls 120 of the I-beams 114, 116 of the main longitudinal members 106. In particular, each pair of upper and lower attachment members 160a, 160b respectively attach to the stacked I-beams 114, 116 of the main longitudinal members 106 so that the first mounting surfaces 166 of the attachment members are positioned adjacent the inboard surfaces of the central vertical walls 120 of the I-beams 114, 116 in a flush manner. Furthermore, the attachment members 160 attach to the main longitudinal members 106 in a well-known manner so as to reliably secure the attachment members 160 to the main longitudinal members 106.

As shown in FIG. 3A, the cross-members 140 attach to the second vertical walls 164 of the attachment members 160. In particular, the planar wall 144 of each cross member 140 is positioned adjacent the second mounting surfaces 168 of the attachment members 140 in a substantially flush manner. Furthermore, the cross members 140 are securely attached to the attachment members 160 in a well-known manner.

As shown in FIG. 2C, the cross-members 140 are positioned so that the in board portions of the mid-level flanges 122, 124 of the main longitudinal members 106 extend into the notches 150 of the cross-members 144. In particular, an upper horizontal edge 170 of each slot 150 extends along an upper surface 172 of the lower flange 122 of the upper I-beam 116 in a substantially flush manner so that the cross-members 140 obtain additional vertical support therefrom. Moreover, the shorter configuration of the cross-member 140 of FIG. 3A is adapted so that the lower horizontal lip 146 extending therefrom is positioned above an upper surface 174 of the lower flange 122 of the lower I-beam 114 of the main longitudinal members 106. Alternatively, the tall cross-member 140 of FIG. 3B is adapted so that the lower lip 146 is positioned below the lower flange 122 of the lower I-beam 114 of the main longitudinal members 106 so as to enable the cross-members 140 to capture the HVAC unit as will be described in greater detail below.

As shown in FIG. 2C, the cross-members 140 of the rear section 34 of the chassis 32 define the second mounting plane. In particular, the cross-members 140 are adapted so that the upper horizontal lip 148 of each cross-member 140 is positioned below the upper flanges 124 of the upper I-beams 116 of the main longitudinal members 106 by a distance T. This is realized by extending the upper lip 148 of each cross-member 140 above the slots 150 by the distance T. Thus, upper horizontal surfaces 176 of the upper lips 148 of the cross members 140 define the second mounting plane which is disposed below the first mounting plane by the distance T and aligned parallel to the first mounting plane.

In the preferred embodiment, the cross members 140 are formed of steel having a thickness of 0.074 inch. Furthermore, the central wall 144 is formed with a width of 672 inches and the upper and lower lips 146, 148 are formed with a width of 12 inches. Moreover, the central planar wall 144 of the short cross members of FIG. 3A are formed with a height of 12 inches while the central planar wall 144 of the tall cross members of FIG. 3B are formed with a height of 17 inches.

As shown in FIGS. 2A–B, in the preferred embodiment, the rear section of the chassis comprises seven cross members 140a–g. In particular, the cross member 140a is positioned at a front end 178 of the rear section of the chassis adjacent the rear vertical riser 70 and the cross member 140b is positioned behind the first cross member 140a by a distance of 50: inches. Furthermore, the cross members 140c and 140d are positioned behind the cross member 140b so that the cross member 140c is positioned immediately in front of a front wheel 68a of the carriage assembly 50 and so that the cross member 140d is positioned immediately behind a rear wheel 68b of the carriage assembly 50. Moreover, the cross members 140a–d comprise the short cross members 140 of FIG. 3A.

As shown in FIGS. 2A–B, in the preferred embodiment, the cross member 140e is positioned behind the fourth cross member by a distance of 18⅝ inches and the cross member 140f is positioned behind the cross member 140e by a distance of 472 inches. Furthermore, the cross members 140e–f comprise the tall cross members of FIG. 3B and are positioned such that the lower lips 146 of the cross members 140e–f extend toward each other. Thus, the cross members 140e–f are able to capture the HVAC unit which extends below the main longitudinal members 106.

As shown in FIG. 2A, in the preferred embodiment, the upper and lower I-beams 114, 116 of each main longitudinal member 106 are formed with unequal lengths. In particular, the lower I-beam 114 is formed with a length of 215⅝ inches and the upper I-beam 116 is formed with a length of 247⅝ inches. Furthermore, since a front end 117 of the upper I-beam 116 is aligned with a front end 115 of the lower I-beam 114, a rear end 119 of the upper I-beam 116 extends from a rear end 118 of the lower I-beam 114 in a rearward manner by an approximate distance of 32 inches.

As shown in FIGS. 2A–B, in the preferred embodiment, the cross member 140g is positioned behind the cross member 140f such that the cross member 140g is positioned adjacent the rear end 118 of the lower I-beam 114 of each main longitudinal member 106. Furthermore, the cross member 140g comprises the short cross member 140 of FIG. 3A.

As shown in FIGS. 2B–C, the plurality of longitudinal support members 102 of the rear section 34 of the chassis 32 further comprise a plurality of elongate inner longitudinal members 180. In particular, the inner longitudinal members 180 longitudinally extend along the rear section 34 of the chassis 30 so as to be disposed between the main longitudinal members 106. Furthermore, the inner longitudinal members 180 extend between the first and second mounting planes of the rear section 34 of the chassis 32 so as to provide additional support for the floor assembly 36 as will be described in greater detail below. Moreover, the inner longitudinal members 180 are preferably formed of a relatively rigid material so as to further rigidify the rear section 34 of the chassis 32 and so as to more effectively support the rear section 38 of the floor assembly 36.

As shown in FIGS. 2B–C, in the preferred embodiment, the inner longitudinal members 180 comprise an elongate central planar wall 182 and a lower and upper elongate lip 184, 186 that extend from the central wall 182 in a substantially perpendicular manner. Furthermore, the inner longitudinal members 180 are positioned so that the central walls 182 are aligned in vertical planes. Moreover, the inner longitudinal members 180 attach to the cross-members 140 in the second mounting plane in a well known manner e.g. by welding, epoxy, or fastener, such that the lower lips 184 of the inner longitudinal members 180 are positioned adjacent the upper lips 148 of the cross-members 140 in a substantially flush manner. Thus, since the inner longitudinal members 180 extend between the first and second mounting planes of the rear section 34 of the chassis 32, upper surfaces 188 of the upper lips 186 of the inner longitudinal members 180 further define the first mounting plane of the rear section 34 of the chassis 32.

In the preferred embodiment, the plurality of the inner longitudinal members 180 comprise a first and second inner longitudinal member 180a, b. Furthermore, the inner longitudinal members 180a, b are uniformly distributed between the first and second main longitudinal members 106a, b. Moreover, the inner longitudinal members 180 are formed of steel having a thickness of 0.074 inches. Additionally, the upper and lower lips 184, 186 of the inner longitudinal members are formed with a width of 12 inches.

Figure 4:
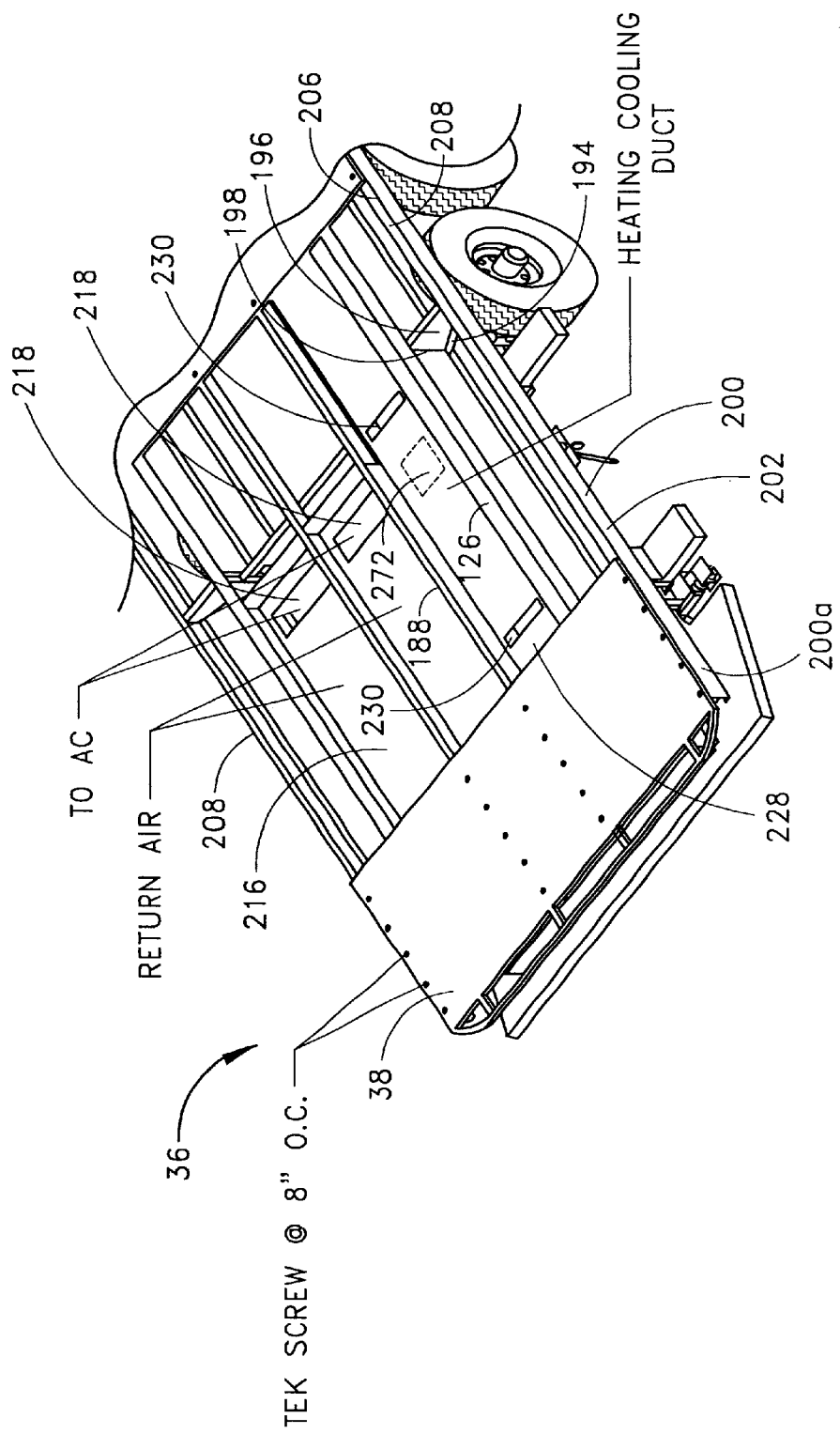
FIG. 4 is a perspective view of the rear section of the chassis of FIG. 2A.

As shown in FIGS. 2A, 2C and 4, the plurality of lateral support members 104 further comprise a plurality of outriggers 190 known in the art. In particular, each outrigger 190 comprises a central planar 192 wall and a lower and upper lip 194, 196 that extend from the central wall 192 in a substantially perpendicular manner. Furthermore, each outrigger 190 is formed of relatively rigid material, such as steel, so as to further rigidify the rear section 34 of the chassis 32. Moreover, each outrigger 190 is formed with an inner vertical edge 198 having a height that substantially matches the height of the central walls 120 of the upper I-beams 116 of the main longitudinal members 106 so as to enable the outriggers 190 to outwardly extend therefrom as will be described in greater detail below.

As shown in FIG. 2C, the outriggers 190 laterally extend from the main longitudinal members 106 to the side edges of the rear section 34 of the chassis 32. In particular, each outrigger 190 is positioned with its central wall 192 aligned in a laterally extending vertical plane and with its inner vertical edge 198 adjacent the vertical wall 120 of the upper I-beams 116 in a substantially flush manner. Furthermore, the central planar wall 192 of each outrigger 190 preferably mounts to the outer surfaces of the central walls 120 of the upper I-beams 116 in the same manner that the inner cross members 140 mount to the inner surfaces of the central walls 120. Specifically, a plurality of attachment members (not shown), which are substantially identical to the attachment members 160 described previously in connection with FIGS. 3A–B, are interposed between the outriggers 190 and the upper I-beams 116 of the main longitudinal members 106. Moreover, each outrigger 190 is positioned so that an upper surface 197 of its upper lip 196 is substantially aligned with the first mounting plane of the rear section 34 of the chassis 32 so as to further define the first mounting plane. Thus, the outriggers 190 laterally extend the rear section 39 of the chassis 32 beyond the wheels 68.

As shown in FIGS. 2B–C and 4, the plurality of rigid support members 100 further comprise a plurality of known outer support members 200 which form the perimeter of the rear section 34 of the chassis 32. In particular, each outer member 200 comprises an elongate central planar wall 202 and a lower and upper elongate lip 204, 206 that extend from the central wall 202 in a substantially perpendicular manner so as to provide the outer members 200 with a cross sectional C shape. Furthermore, the outer members 200 comprise a plurality of longitudinal outer members 200a that form the side edges of the rear section 34 of the chassis 32 and a plurality of lateral outer members 200b that form the rear edge of the chassis 32.

As shown in FIGS. 2B–C and 4 the longitudinal outer members 200a longitudinally extend along the outer edges of the outriggers 190 so as to interconnect the outriggers 190 in a well known manner. Furthermore, the longitudinal outer members 200a are positioned so that the upper and lower lips 206, 204 extend inwardly and so that upper surfaces 208 of the upper lips 206 of the longitudinal outer members 200a are substantially aligned in the first mounting plane so as to further define the first mounting plane.

As shown in FIGS. 2A–B, the lateral outer members 200b laterally extend along the rear end 62 of the chassis 32. In particular, the outer members 200b attach to the rear ends of the longitudinal members 106, 180 in a manner similar to that of longitudinal outer members 200a so as to provide secure interconnection therebetween. Specifically, the member 200b is positioned so that the upper lip 206 of the member 200b is substantially aligned with the first mounting plane and so that the lower lip 204 of the member 200b is substantially aligned with the lower flanges 122 of the upper I-beams 116 of the main longitudinal members 106. Moreover, the central wall 202 of the member 200b defines an opening 214 adapted to extend an air return conduit of the HVAC unit as will be described in greater detail below.

As shown in FIGS. 2C and 4, the rear section 38 of the floor assembly 36 attaches directly to the rear section 34 of the chassis 32 in the first mounting plane. In particular, the rear section 38 of the floor assembly 36, comprising at least one rigid planar wall of a relatively rigid material such as: "plywood, horizontally extends over the rear section 34 of the chassis 32. Furthermore, the rear section 34 of the floor assembly 32 is securely mounted directly to the longitudinal members 106, 180, 200a, along their respective upper surfaces 126, 188, and 208 in a well known manner. Thus, the rear section 38 of the floor assembly 36 provides the rear section 34 of the chassis 32 with increased shear strength.

Thus, it will be appreciated that the rear section 34 of the chassis 32 of the travel trailer 30 of the present invention is formed with improved rigidity so as to enable the rear section 34 to maintain a substantially planar shape in response to spatially distributed forces acting thereon. In particular, the main longitudinal members 106 each comprising the stacked I-beams 114, 116 and the inner longitudinal members 180 provide the rear section with relatively large rigidity in response to relatively large bending moments created by the essentially cantilevered mid-section 64 and front section 66 of the chassis 32. Furthermore, the inner cross members 140 and the outer outriggers 190 provide the rear section 34 with relatively large rigidity in response to relatively large bending moments created by the cantilevered pop-out sections 80 of the housing member 42. Moreover, since the rear section 38 of the floor assembly 36 mounts directly to the rear section 34 of the chassis 32, addition shear strength is realized, thereby further rigidifying the rear section 34 of the chassis.

In one embodiment, the rear section 34 of the chassis 32 further comprises at least one lower horizontal planar wall 216, as shown in FIGS. 2C and 4. In particular, the lower wall is positioned substantially in the second mounting plane of the chassis so as to longitudinally extend adjacent the inner longitudinal members 180 in a horizontal manner. Furthermore, the lower wall 216, mounted to the second mounting surface in a well known manner is preferably formed of structural insulating material such as 3" thick structural insulating material associated with the trademark FOME-CORE® which is manufactured by the Monsanto Corporation.

In the preferred embodiment, the at least one lower wall 216 comprises a first wall 216a that extends between the first main longitudinal member 106a and the first inner longitudinal member 180a, and a second wall 216b that extends between the first and second inner longitudinal members 180a, 180b. However, it will be appreciated that in another embodiment, the at least one lower wall 216 could be adapted so as to completely extend between the main longitudinal members 106.

Thus, as shown in FIGS. 2C and 4, the rear section 34 of the chassis 32 defines the plurality of longitudinally extending channels 40. In particular, the channels 40 are defined by the space between the rear section 38 of the floor assembly 36, the vertical walls 120 of the upper I-beams 116 of the main longitudinal members 106, and the central walls 182 of the inner longitudinal members 180. Consequently, as will be described in greater detail below, the channels 40 are able to allow elements of the trailer 30 to be longitudinally disposed therein.

In the preferred embodiment, the plurality of channels comprise three channels 40a–c as shown in FIG. 2C. In particular, the channels 40a, b are further defined by the lower horizontal walls 216a, b respectively so as to substantially enclose the channels 40a, b. Furthermore, the channel 40c is defined by the space between the second inner longitudinal member 180b, the second main longitudinal member, and the rear section 38 of the floor assembly 36. Moreover, since the chassis 32 is devoid of a planar wall that longitudinally extends along the second mounting plane directly underneath the channel 40c, the channel 40c is substantially exposed from underneath the chassis. However, it will be appreciated that, in another embodiment, the channel 40c could be enclosed in the manner of the channels 40a–b.

In one embodiment, the channels 40a, b form an air return conduit for the HVAC unit 138 positioned beneath the rear section 34 of the chassis 32. In particular, as shown in FIG. 4, an opening 218 is formed in each lower wall 246a, b adjacent the HVAC unit 138 so as to communicate the channels 216a, b with the HVAC unit. Furthermore, an elbow channel member 220 adapted to receive a vertical airflow into a vertical input port 222 and redirect the airflow through a horizontal output port 224 in a horizontal direction, is positioned at the rear end 62 of the chassis 32 adjacent the rear lateral member 200b. Furthermore, as shown in FIG. 2A, the elbow member 220 is positioned so that the output port 224 communicates with the channels 40a, b via the opening 214 in the lateral member 200b. Moreover, as shown in FIG. 1A, the elbow member 220 is positioned so that the input port 222 communicates with the interior living space 46 of the trailer via an opening 226 formed in the rear section 38 of the floor assembly 36. Thus, return air from the living space is able to travel through the elbow member 220 and the channels 40a, b so as to arrive at the HVAC unit.

In one embodiment, as shown in FIGS. 2C and 4, a heating/cooling duct 228 of the HVAC unit 138 is disposed in the channel 40c. In particular, the known HVAC air supply duct 228 defining a plurality of upper openings 230 and a lower opening 232 (shown in phantom) is positioned within the channel 40c so as to longitudinally extend above the rear section 34 of the chassis 32 in a substantially flush manner. Furthermore, the duct 228 is positioned so as to communicate an output port 234 of the VAC unit 138 (FIG. 2B) with the HVAC duct 228 via the lower opening 232. Moreover, a plurality of registers 236 (FIG. 1B) are extended through openings 238 defined in the rear section 38 of the floor assembly 36 above the channel 40c and through the openings 230 of the HVAC duct 228 so as to communicate the output port 236 of the HVAC unit 138 with the interior living space 46 of the trailer 30.

In one embodiment, one of the channels 40 functions as cable trag for an electrical power distribution system of the trailer. In particular, as shown in FIG. 2C, at least one known insulated 110 Volt electrical cable 240 coupled to the electrical power distribution system of the trailer is disposed within the channel 40c, so as to longitudinally extend the cable above the inner cross members 140 of the rear section 34 of the chassis 32 in a substantially flush manner.

Thus, it will be appreciated that the plurality of channels 40 defined by the rear section 34 of the chassis 32 simplify the assembly of the trailer 30. In particular, the channels 40 are easily adaptable so as to form return air conduits for the HVAC unit 138. Furthermore, the channels enable the air supply duct 228 of the HVAC unit 138 to be easily disposed therein. Moreover, the channels 40 function as a raceway for electrical cables so as to simplify the assembly of the electrical power distribution system of the trailer.

Although the preferred embodiment of the present invention has shown, described and pointed out the fundamental novel features of the invention as applied to this embodiment, it will be understood that various omissions, substitutions and changes in the form of the detail of the device illustrated may be made by those skilled in the art without departing from the spirit of the present invention. Consequently, the scope of the invention should not be limited to the foregoing description, but should be defined by the appending claims.

What is claimed is:

1. A fifth wheel travel trailer comprising:
    a floor assembly comprising a main section and at least one elevated section;
    a carriage assembly comprising a plurality of rotatably mounted wheels so as to provide the trailer with mobility;
    a chassis having a main section and at least one elevated section, wherein the main section of the chassis comprises a first and a second longitudinally extending main longitudinal member each having an upper and a lower mounting surface separated by a first height, a plurality of longitudinally extending inner longitudinal members each having an upper and a lower mounting surface, and a plurality of laterally extending inner cross members each having an upper mounting surface, wherein the plurality of inner cross members are laterally disposed between the main longitudinal members so as to interconnect the main longitudinal members such that the upper mounting surfaces of the main longitudinal members align with a first mounting plane and such that the upper mounting surfaces of the inner cross members align with a second mounting plane positioned beneath the first mounting plane, wherein the plurality of inner longitudinal members are disposed between the main longitudinal members such that the lower mounting surfaces of the inner longitudinal members are positioned adjacent the upper mounting surfaces of the inner cross members and such that the upper mounting surfaces of the inner longitudinal members are substantially aligned with the first mounting plane, wherein the main longitudinal members and the plurality of inner longitudinal members provide rigidity along the longitudinal direction and the plurality of inner cross members provide rigidity along the lateral direction, wherein the first height of the main longitudinal members is selected so as to permit direct mounting of the floor assembly on the first mounting plane and direct mounting of the carriage assembly to the lower mounting surfaces of the main longitudinal members, wherein the floor assembly mounted directly on the first mounting plane further rigidifies the main section of the chassis, wherein the space between main section of the floor assembly, the main longitudinal members, the inner longitudinal members, and the inner cross members defines a plurality of longitudinally extending channels; and a housing member comprising a plurality of walls so as to define an interior living space therein, wherein the housing member upwardly extends from the chassis so as to receive support therefrom.

2. The trailer of claim 1, wherein the housing member further comprises a plurality of pop-out sections that extend from the housing member so as to enlarge the interior living space of the housing member.

3. The trailer of claim 1, wherein the chassis further comprises a plurality of outriggers that extend from the main longitudinal members in a lateral manner so as to extend the width of the main section of the chassis.

4. The trailer of claim 3, wherein the chassis further comprises a plurality of outer members that are disposed at the perimeter of the main section of the chassis.

5. The trailer of claim 1, wherein the first and second main longitudinal members each comprise a lower and upper I-beam positioned in a stacked formation.

6. The trailer of claim 5, wherein each of the lower and upper I-beams comprise a central wall and a lower and upper planar flange extending from the central wall in a substantially perpendicular manner.

7. The trailer of claim 6, wherein each of the lower and upper I-beams is formed of steel such that the central wall has an approximate height of 8 inches and an approximate thickness of 3/16 inch and such that the lower and upper flanges each have an approximate thickness of 5/32 inch and an approximate width of 3 inches.

8. The trailer of claim 6, wherein the central walls of the upper and lower I-beams are corrugated so as to increase the strength to weight ratio of the main longitudinal members.

9. The trailer of claim 6, wherein the carriage assembly having a plurality of mounting surface couples with the main longitudinal members such that the lower flanges of the lower I-beams overlay the plurality of mounting surfaces of the carriage assembly.

10. The trailer of claim 1, wherein each of the inner cross members comprises a central planar wall aligned in a vertical manner and an upper lip having an upper planar surface extending from the central wall in a substantially perpendicular manner, wherein the upper mounting surfaces of the inner cross members comprise the upper planar surfaces of the upper lips of the inner cross members.

11. The trailer of claim 1, wherein the chassis further comprises a first plurality of attachment members that are interposed between the main longitudinal members and the inner cross members in a flush manner.

12. The trailer of claim 1, wherein the plurality of inner cross members comprise seven spatially distributed inner cross members.

13. The trailer of claim 1, further comprising a central heating/ventilation/air conditioning system which comprises a central heating/ventilation/cooling unit having an input port and an output port, an air return conduit extending from the input port, and an output air duct extending from the output port.

14. The trailer of claim 13, wherein the chassis further comprises a first partition wall horizontally disposed between the first and second main longitudinal members in the second mounting plane so as to define a first longitudinally extending enclosed channel, wherein the first enclosed channel forms a portion of the return air conduit of the central HVAC system.

15. The trailer of claim 14, wherein the trailer further comprises an airflow elbow member having a first and second port such that an airflow that enters the first port exits the second port in a perpendicular manner, wherein the elbow member is positioned at a rear end of the chassis so as to communicate the interior living space of the trailer with the first enclosed channel, wherein the partition wall defines an opening which communicates the input port of the HVAC unit with the first enclosed channel, thereby defining the return air conduit of the HVAC system.

16. The trailer of claim 13, wherein the output air duct is longitudinally disposed within the plurality of channels.

17. The trailer of claim 16, wherein the output air duct defines a lower opening adapted to communicate the output air duct with the output port of the HVAC unit, wherein the main section of the floor assembly defines a plurality of openings, and wherein the output air duct further defines a plurality of upper openings that align with the plurality of opening of the main section of the floor assembly so as to communicate the output port of the HVAC unit with the interior living space of the trailer.

18. The trailer of claim 16, further comprising an electrical distribution system having at least one electrical cable, wherein the at least one electrical cable longitudinally extends along the plurality of channels.

19. The trailer of claim 1, wherein the first height between the upper and lower mounting surfaces of the main longitudinal members is approximately 16 inches.

20. A travel trailer comprising:

a chassis having a main section and at least one elevated section wherein the main section of the chassis is comprised of a plurality of lateral cross-members and a plurality of longitudinal members that are interconnected at a plurality of interconnection points so that upper surfaces of the plurality of longitudinal members are substantially co-planer at a first height, wherein the plurality of lateral cross-members are attached to the plurality of longitudinal members such that the plurality of interconnection points are located beneath the first height, wherein selected ones of the plurality of longitudinal members are vertically dimensioned so as to permit direct attachments of other components of the travel trailer to upper and lower surfaces of the selected ones of the plurality of longitudinal members;

a carriage assembly comprising a plurality of rotatably mounted wheels so as to provide the trailer with mobility, wherein the carriage assembly mounts directly to the lower surfaces of the selected ones of the plurality of the longitudinal members and downwardly extends from the main section of the chassis so as to support the chassis;

a floor comprised of at least one panel directly attached to the upper surfaces of the plurality of longitudinal members so that at least one longitudinal channel is defined by the floor, the plurality of longitudinal members and the lateral cross-members; and a housing member defining an interior living space therein, wherein the housing member upwardly extends from the chassis so as to receive support therefrom.

21. The trailer of claim 20, wherein the plurality of longitudinal members comprise a first and second main longitudinal member.

22. The trailer of claim 21, wherein the first and second main longitudinal members each comprise a lower and upper I-beam positioned in a stacked formation.

23. The trailer of claim 22, wherein each of the lateral cross members comprises a central planar wall aligned in a vertical manner and an upper lip having an upper planar surface extending from the central wall in a substantially perpendicular manner, wherein the plurality of interconnection points are positioned on the upper planar surface of the central planar wall of the lateral cross members.

24. The trailer of claim 23, wherein the lateral cross members extend from the longitudinal members in a perpendicular manner.

25. The trailer of claim 24, wherein the main section of the chassis further comprises a plurality of outriggers that laterally extend from the first and second main longitudinal members so as to extend the width of the main section of the chassis.

26. The trailer of claim 25, wherein the main section of the chassis further comprises a plurality of longitudinal outer members disposed adjacent the plurality of outriggers so as to interconnect the plurality of outriggers.

27. The trailer of claim 26, wherein the main section of the chassis further comprises at least one lateral outer member disposed at a rear edge of the main section of the chassis so as to interconnect the main longitudinal members.

28. The trailer of claim 20, wherein the selected ones of the plurality of longitudinal members have vertical dimension of approximately 16 inches.

* * * * *